United States Patent [19]

Van Der Veer et al.

[11] Patent Number: 5,684,123
[45] Date of Patent: Nov. 4, 1997

[54] PREPARATION OF CATALYST SOLUTION

[75] Inventors: Frits Van Der Veer; Rudolf Jacobus Wijngaarden, both of Amsterdam, Netherlands

[73] Assignee: Shell Oil Company, Houston, Tex.

[21] Appl. No.: 783,964

[22] Filed: Jan. 15, 1997

Related U.S. Application Data

[62] Division of Ser. No. 442,521, May 16, 1995.

[51] Int. Cl.$^6$ ............ C08G 67/02; C08K 5/49; B01J 31/00
[52] U.S. Cl. ............ 528/392; 528/392; 528/396; 524/709; 524/711; 524/713; 502/162
[58] Field of Search ............ 528/392, 396; 524/709, 711, 713; 502/162

[56] References Cited

FOREIGN PATENT DOCUMENTS

| | | |
|---|---|---|
| 0 361 623 | 4/1990 | European Pat. Off. . |
| 0 364 046 | 4/1990 | European Pat. Off. . |
| 0 501 576 | 8/1992 | European Pat. Off. . |
| 0 520 588 | 12/1992 | European Pat. Off. . |

OTHER PUBLICATIONS

Encl. PCT Search Report May 9, 1995.

*Primary Examiner*—Samuel A. Acquah

[57] ABSTRACT

A process for the preparation of a solution of a catalyst system, suitable for use in a process for copolymerizing carbon monoxide and one or more ethylenically unsaturated compounds, which comprises (a) combining a palladium compound, a bisphosphine of the general formula $R^1R^2P-R-PR^3R^4$ (I) wherein each of $R^1$, $R^2$, $R^3$ and $R^4$ independently represents an aromatic hydrocarbyl group which is substituted with an alkoxy group and R represents a bivalent bridging group containing at least two carbon atoms in the bridge, and a lower alcohol as solvent, and (b) admixing the obtained combination after a generation period G, during which a temperature T in the range of 0°–70° C. is maintained, with an acid having a pKa of less than 2, whereby the said generation period G is selected such that the value for G (in hours) and the temperature T in °C.) are related as $$G \leq 6.0 \times 10^{-21} \exp\left(\frac{14500}{T+273.2}\right)$$

3 Claims, No Drawings

PREPARATION OF CATALYST SOLUTION

This is a division of application Ser. No. 08/442,521, filed May 16, 1995.

FIELD OF THE INVENTION

The invention relates to a process for the preparation of a catalyst solution which may be used in a process for the copolymerization of carbon monoxide with one or more ethylenically unsaturated compounds.

BACKGROUND OF THE INVENTION

In the copolymerization process in which the monomers carbon monoxide and ethylenically unsaturated compounds are reacted under polymerization conditions in the presence of a catalyst system, based on a palladium compound, a bidentate bisphosphine ligand and a source of anions, linear substantially alternating copolymers of carbon monoxide and said ethylenically unsaturated compound(s) are produced. These copolymers have established utility in various outlets for thermoplastics. They may be further processed by conventional techniques into films, sheets, plates, fibres and shaped articles such as containers for food and drinks and various parts in the automotive industry. A suitable method for the preparation of the linear copolymers, which is usually performed in batch operation, is described in EP-181014.

The batchwise preparation of the copolymers is generally carried out by introducing a solution of the catalyst into a reactor which contains the monomers and a diluent in which the copolymers are insoluble of virtually insoluble. Various liquids may be considered for use as diluent in the copolymerization reaction. Lower aliphatic alcohols are preferred. Methanol is particularly preferred since it has been found that the catalysts display their highest level of activity if a diluent of the type is used in the copolymerization reaction.

Accordingly, it would be advantageous to introduce a catalyst solution into the reactor along with a lower aliphatic alcohol as solvent. However, it has been observed that the selection of a lower aliphatic alcohol as solvent for the catalyst system entails two problems. One problem relates to the preparation of the catalyst and another involves its storability. Initially, catalyst systems were applied which comprised a palladium compound and an anion source, and a bidentate bisphosphine ligand of the formula $(Q)_2P$—R—$P(Q)_2$ whereby Q represents an aromatic hydrocarbyl group and R represents a bivalent organic bridging group containing at least two carbon atoms in the bridge. In a subsequent investigation is was found that the performance of the catalyst system could be improved significantly by replacing the ligand of the formula $(Q)_2P$—R—$P(Q)_2$ by a ligand of formula $R^1R^2P$—R—$PR^3R^4$ wherein $R^1$, $R^2$, $R^3$ and $R^4$ independently represent alkoxy substituted aromatic hydrocarbyl groups. However, the solubility of these substituted bisphosphine ligands in methanol and other lower aliphatic alcohols proved to be poor and hence it was proposed to perform the preparation of the catalyst in another solvent such as toluene.

Another problem encountered with the use of a lower aliphatic alcohol, in particular methanol, as catalyst solvent, consists in the short shelflife of the catalysts thus prepared. This is apparent form the significant plating-out of palladium present in the catalyst system. In principle, this problem can be circumvented by preparing a fresh catalyst solution prior to each batch operation of the copolymerization process. Obviously it would be desirable to prepare a larger quantity of catalyst which can be stored so that a portion of the stored catalyst can be applied to each batch as needed.

Problems encountered with the use of methanol as solvent in the preparation of the catalyst system are discussed in EP-360359. According to this document, the storability of the catalyst is improved by using an aprotic polar solvent in the preparation of the catalyst. Acetone is particularly preferred.

It appears that the solubility of the ligands of the formula $R^1R^2P$-13 R—$PR^3R^4$ is higher in acetone than in methanol. In multi-batch operations of the copolymerization process, it is common practice to separate the product by removing the diluent form the reaction medium, (e.g. by distillation) and to recycle the diluent to the next batch. Since fresh catalyst is supplied for each batch, this implies—following the procedure of EP-360359—that the amount of acetone builds up after each recycle. This necessitates a purifying treatment of the recycle stream, or a significant bleed of the stream. Both measures are unattractive for economic reasons.

Preparation of the catalyst as a solution in acetone and use of the same liquid as diluent in the co-polymerization reaction might also be considered. However, as previously noted, the use of acetone as the only diluent in the copolymerization reaction is less attractive in view of the lower level of activity of the catalysts in that environment.

Surprisingly, it has now been found that by first combining the palladium compound, the bisphosphine ligand and a lower aliphatic alcohol as solvent and the admixing the resulting combination with an acid after a generation period related to the temperature at which the catalyst preparation is performed, a catalyst solution of good storability is obtained. This allows the use of a single liquid in the preparation of the catalyst and in the production of the copolymers.

SUMMARY OF THE INVENTION

A process for the preparation of a solution of a catalyst system, suitable for use in a process for copolymerizing carbon monoxide and one or more ethylenically unsaturated compounds is presented which comprises (a) combining a palladium compound, a bisphosphine of the general formula $R^1R^2P$—R—$PR^3R^4$ (I) wherein each of $R^1$, $R^2$, $R^3$ and $R^4$ independently represents an aromatic hydrocarbyl group which is substituted with an alkoxy group and R represents a bivalent bridging group containing at least two carbon atoms in the bridge, and a lower alcohol as solvent, and (b) admixing the obtained combination after a generation period G, during which a temperature T in the range of 0°–70° C. is maintained, with an acid having a pKa of less than 2, whereby the said generation period G is selected such that the value for G (in hours) and the temperature T (in °C.) are related as $$G \leq 6.0 \times 10^{-21} \exp\left(\frac{14500}{T+273.2}\right)$$

DETAILED DESCRIPTION OF THE INVENTION

It has been observed that the generation period is limited to a maximum value, related to the temperature at which the catalyst preparation is performed. The selection of a generation period beyond this maximum results in decomposition of the catalyst system which is apparent from significant plating out of palladium.

In step (a) of the process, i.e. the combination of a palladium compound, a bisphosphine and a solvent, the use of a palladiumt salt is preferred. Suitable salts include salts of mineral acids such as sulphuric acid, nitric acid and phosphoric acid, salts of carboxylic acids and salts of sulphonic acids such as methanesulphonic acid, para-toluenesulphonic acid and trifluoromethanesulphonic acid. Preferably, a palladium salt of a carboxylic acid is used, for example acetic acid, propionic acid, citric acid and halogenated carboxylic acids such as trichloroacetic acid and trifluoroacetic acid. A particularly preferred compound is palladium (II) acetate.

In view of the good performance exhibited by catalysts having a ligand of formula (I), whereby each of $R^1$, $R^2$, $R^3$ and $R^4$ represents a phenyl group, substituted with an alkoxy group at an ortho-position with respect to the phosphorus atom to which the phenyl group is bound, these substituted bisphosphines are particularly preferred. The alkyl groups in the alkoxy groups are usually $C_1-C_4$ groups having their common meaning of indication methyl, ethyl, propyl, isporoplyl, n-butyl, sec. butyl, isobutyl and tertiary butyl groups. Preferably, each of $R^1$, $R^2$, $R^3$ and $R^4$ is an ortho-methoxyphenyl group. The bivalent bridging group R in the bisphosphines of formula (I), preferably comprises three atoms in the bridge, at least two of which are carbon atoms. Most preferably, R represents a trimethylene group. Very good results can be obtained by employing 1,3-bis[bis(2-methoxyphenyl)phosphino]propane as the bisphosphine.

The palladium compound and the bisphosphine of formula (I) are combined with a solvent which is substantially a lower alcohol. Alcohols having from 1 to 4 carbon atoms such as methanol, ethanol or butanol are preferred. Although minor amounts of other solvents (for example up to 20% vol relative to the volume of the lower alcohol) can be tolerated as can mixtures of more than one lower alcohol this is not the preferred practice of the invention. Preferably, methanol is used is the only solvent.

In a preferred embodiment of the invention, first the bisphosphine of formula (I) is dissolved or suspended in the solvent and subsequently the palladium compound is supplied. Other procedures of combining the palladium compound, the bisphosphine and the solvent may be followed, e.g. adding the palladium compound and the bisphosphine simultaneously to the solvent. However, dispersing the bisphosphine in the solvent before the palladium compound is added is generally preferred because the catalyst will usually thereby exhibits the highest level of activity. Similarly combining only a portion of the total amount of palladium compound with the bisphosphine and the solvent and supplying the remainder of the palladium compound afterwards (e.g. during step (b) of the process together with the supply of acid) is not a preferred practice of this invention.

In the context of the present invention, the generation period G is deemed to start when the total or substantially total amounts of palladium compound and bisphosphine have been combined with the solvent. In the preferred embodiment described above, the generation period therefore starts as soon as the total amount of the palladium compound has been supplied. The generation period G is deemed to end when the obtained combination is admixed with the acid. The admixing typically occurs by adding the acid to the obtained combination. Typically the period of addition ranges from 10 seconds up to 2 hours.

The temperature which is maintained during the generation period is advantageously the same as the temperature at which step (b), the mixing between the combination obtained in step (a) and the acid, is effected, and is also the same as the temperature prevailing during step (a). Preferably each of these temperatures is in the range of 20°–50° C. This is particularly true where methanol is the solvent.

The relation between the maximum value of the generation period G and the temperature T indicates that the generation period should not exceed a certain value, which depends on the temperature selected in the range. Preferably, the relation between the generation period and the temperature is determined by $$G \leq 9.3 \times 10^{-22} \exp\left(\frac{15000}{T+273.2}\right)$$

It has further been observed, that selecting a very short generation period may involve a complication in that the resulting mixture of the combination obtained in step (a) and the acid is not directly suitable to be used as catalyst, but only after some time of storage. In such cases a precipitate is formed upon admixing with the acid, which precipitate gradually dissolves upon standing. While this delay can be accepted in some cases, it would generally be desirably that after step (b) at least a portion of the resulting mixture can be used directly as catalyst in a batch of the copolymerization process and that the remainder can be stored until it is needed in a subsequent batch of the process.

Accordingly, it is preferred to select the generation period such that $$G \geq 7.1 \times 10^{-24} \exp\left(\frac{18800}{T+273.2}\right)$$

The acid component of the catalyst system, used in step (b) of the process of the invention, has a pKa of less than 2, measured in aqueous solution at 18° C. The acid may be inorganic, such as fluoboric acid or organic, such as a sulphonic acid or a carboxylic acid. Preferably a carboxylic acid having a pKa value of less than 2 is used. Trifluoroacetic acid is a particularly preferred acid to be used in preparing the catalyst system.

The catalyst solutions prepared according to the invention have good storage stability and are eminently suitable to be used in the copolymerization process for preparing linear alternating copolymers of carbon monoxide and one or more ethylenically unsaturated compounds.

The invention therefore also relates to a process for the preparation of copolymers of carbon monoxide and one or more ethylenically unsaturated compound by reacting the monomers under polymerization conditions in the presence of a diluent in which the copolymers are insoluble or virtually insoluble and in the presence of a catalyst solution prepared according to this invention. In a preferred embodiment of this process the diluent used has substantially the same composition as the solvent used during the preparation of the catalyst solution.

Suitable ethylenically unsaturated compound include compounds consisting of carbon and hydrogen only and compounds also comprising one or more heteroatoms such as oxygen or nitrogen. Examples are unsaturated esters such as vinylacetate and vinylpropionate.

Unsaturated hydrocarbons are preferred as starting materials for the copolymerization process. Suitable examples are ethene, propene, cyclopentene and styrene. The lower olefins are most preferred, in particular ethene or a mixture of ethene and propene.

The copolymerization process, performed in the presence of a catalyst solution prepared according to the invention, is preferably carried out at a temperature in the range from 30° to 150° C., and at a pressure in the range from 20 to 100 bar, whereby the molar ration between carbon monoxide and ethylenically unsaturated compound(s) is in the range from 5:1 to 1:5 and the amount of catalyst solution such that per mole of ethylenically unsaturated compound to be polymerized, from $10^{-7}$ to $10^{-2}$ gram-atom of palladium is present.

The invention is further illustrated by the following nonlimiting examples.

EXAMPLE 1

A number of catalyst solutions were prepared as follows:

In each case a 1000 ml reactor vessel was charged with 395 grams of methanol at ambient pressure. The temperature was then raised to the pre-set value T and maintained at that value. Subsequently, 3.74 g of 1,3-bis[bis(2-methoxyphenyl)-phosphino]propane was added. A slurry was formed which was stirred for 20 minutes. To this slurry 1.50 g of solid palladium acetate was added, causing the ligand to dissolve to form an organo-metal complex.

After a generation period of G hours, 1.6 g of trifluoroacetic acid was added and the solution was allowed to react during 30 minutes.

Finally, the contents of the reactor were discharged into a 1000 ml jar and allowed to cool down to ambient temperature. The obtained brown catalyst solutions were stored in a glass jar. Air and daylight were not excluded during storage.

The production temperatures T and the generation periods G for each catalyst solution are listed below in Table 1.

TABLE 1

| Catalyst Solution | Production Temperature (°C.) | Generation Period (Hrs.) |
|---|---|---|
| 1 | 23 | 8 |
| 2 | 26 | 4.5 |
| 3 | 32 | 2 |
| 4 | 40 | 0.5 |

The activity of all catalysts solutions was comparable to that of a conventional catalyst solution in acetone. It was observed that upon storage the solutions showed signs of catalyst decomposition visible by the formation of metallic palladium (plating) as a mirror on the glass wall. However, significant plating occured only after storage for more than one week.

By plotting the temperature and generation period data, it can be seen that the relation between G and T fulfils the condition $$G \leq 6.0 \times 10^{-21} \exp\left(\frac{14500}{T+273.2}\right)$$

The relation between G and T approximately fulfils the equation $$G = 9.3 \times 10^{-22} \exp\left(\frac{15000}{T+273.2}\right)$$

such that the experimental values of G are equal to or slightly below the calculated values for G.

EXAMPLE 2

A number of catalyst solutions were prepared, substantially as described in Example 1, whereby, however, at comparable temperature values shorter generation periods were applied.

The production temperatures T and the generation periods G for each catalyst solution are listed in Table 2.

TABLE 2

| Catalyst Solution | Production Temperature (°C.) | Generation Period (Hrs.) |
|---|---|---|
| 5 | 20 | 7.5 |
| 6 | 27 | 1.7 |
| 7 | 28 | 1 |
| 8 | 35 | 0.2 |

Again, it was observed that upon storage no significant plating occured for more than one week.

By plotting the temperature and generation period data, it can be seen that the relation between G and T approximately fulfils the equation $$G = 7.1 \times 10^{-28} \exp\left(\frac{18800}{T+273.2}\right)$$

EXAMPLE 3

A number of catalyst solutions were prepared, substantially as described in Example 1, whereby, however, generation periods were applied, which, for a certain temperature value, were intermediate between those applied in Example 1 and in Example 2.

The production temperatures T and the generation periods G for each catalyst solution are listed in Table 3.

TABLE 3

| Catalyst Solution | Production Temperature (°C.) | Generation Period (Hrs.) |
|---|---|---|
| 9 | 27 | 1.9 |
| 10 | 28 | 2.3 |
| 11 | 32 | 1 |
| 12 | 35 | 0.5 |
| 13 | 37 | 0.5 |
| 14 | 40 | 0.2 |

Upon storage, none of these catalyst solutions showed significant plating for more than one week.

EXAMPLE 4

A number of catalyst solutions were prepared, substantially as described in Example 1, whereby, however, at a certain temperature value, the applied generation periods were shorter than those applied in Example 2.

The production temperatures T and the generation periods G for each catalyst solution are listed in Table 4.

TABLE 4

| Catalyst Solution | Production Temperature (°C.) | Generation Period (Hrs.) |
|---|---|---|
| 15 | 20 | 0.2 |
| 16 | 20 | 1.9 |
| 17 | 20 | 4.5 |
| 18 | 24 | 0.2 |
| 19 | 24 | 0.5 |
| 20 | 24 | 2 |
| 21 | 28 | 0.2 |
| 22 | 28 | 0.6 |
| 23 | 32 | 0.5 |

In all cases, instead of brown solutions, orange solutions containing a white precipitate were obtained.

Upon storage, the orange solutions gradually darkened and the precipitate gradually dissolved.

After a storage period of one to two weeks, brown solutions, as obtained in Example 1 resulted, which could be further stored for more than one week before significant plating was observed. The activity of the eventually obtained brown solutions was again comparable to the activity of a conventional catalyst solution in acetone.

EXAMPLE A (For comparison, Not according to the invention)

A number of catalyst solutions were prepared, substantially as described in Example 1, whereby however at comparable temperature values longer generation periods were applied. The production temperatures T and the generation periods G for each catalyst solution are listed below.

TABLE 5

| Catalyst Solution | Production Temperature (°C.) | Generation Period (Hrs.) |
|---|---|---|
| 24 | 20 | 20 |
| 25 | 27 | 16 |
| 26 | 27 | 5.0 |
| 27 | 32 | 4 |
| 28 | 35 | 1.9 |
| 29 | 40 | 1 |
| 30 | 43 | 0.6 |
| 31 | 50 | 0.2 |
| 32 | 55 | 0.5 |

In all cases, a brown solution was obtained, in which upon storage significant plating was observed in less than one week. By plotting the temperature and generation period data, it can be seen that the relation between G and T fulfils the condition $$G \leq 6.0 \times 10^{-21} \exp\left(\frac{14500}{T+273.2}\right)$$

What is claimed is:

1. A process for the preparation of copolymers of carbon monoxide and one or more ethylenically unsaturated compounds by reacting carbon monoxide and one or more ethylenically unsaturated compounds under polymerization conditions in the presence of a diluent in which the copolymers are insoluble or virtually insoluble and in the presence of a catalyst solution prepared by (a) combining a palladium compound, a bisphosphine of the general formula $R^1R^2P$—R—$PR^3R^4$ (I) wherein each of $R^1$, $R^2$, $R^3$ and $R^4$ independently represents an aromatic hydrocarbyl group which is substituted with an alkoxy group and R represents a bivalent bridging group containing at least two carbon atoms in the bridge, and a lower alcohol as solvent, and (b) admixing the obtained combination after a generation period G, during which a temperature T in the range of 0°–70° C. is maintained, with an acid having a pKa of less than 2, whereby the said generation period G is selected such that the value for G (in hours) and the temperature T (in °C.) are related as $$G \leq 6.0 \times 10^{-21} \exp\left(\frac{14500}{T+273.2}\right).$$

2. The process of claim 1 wherein the temperature is in the range from 30° to 150° C., at a pressure in the range from 20 to 100 bar and wherin the molar ratio between carbon monoxide and ethylenically unsaturated compound(s) is in the range from 5:1 to 1:5 and the quantity of catalyst solution such that per mole of ethylenically unsaturated compound(s) to be polymerized from $10^{-7}$ $10^{-2}$ gram-atom of palladium is present.

3. The process of claim 2 wherein ethene or a mixture of ethene and propene comprise said ethylenically unsaturated compounds.

* * * * *